United States Patent [19]

Zohar et al.

[11] Patent Number: 5,076,208

[45] Date of Patent: Dec. 31, 1991

[54] ULTRASOUND-MEDIATED ADMINISTRATION OF COMPOUNDS INTO AQUATIC ANIMALS

[75] Inventors: Yonathan Zohar, Jersualem, Israel; Antony D'Emanuele, London, England; Joesph Kost, Omer, Israel; Robert S. Langer, Newton, Mass.

[73] Assignee: Massachusetts Institute of Technology, Cambridge, Mass.

[21] Appl. No.: 583,573

[22] Filed: Sep. 14, 1990

[51] Int. Cl.$^5$ .............................................. A01K 61/00
[52] U.S. Cl. .......................................... 119/2; 119/3; 119/4
[58] Field of Search ................................ 119/2, 3, 4

[56] References Cited

FOREIGN PATENT DOCUMENTS

| | | | |
|---|---|---|---|
| 54-97300 | 8/1979 | Japan | 119/3 |
| 60-49748 | 3/1985 | Japan | 119/3 |
| 766552 | 10/1980 | U.S.S.R. | 119/3 |
| 1261598 | 10/1986 | U.S.S.R. | 119/3 |

*Primary Examiner*—Robert P. Swiatek
*Attorney, Agent, or Firm*—Kilpatrick & Cody

[57] ABSTRACT

A method for administering compounds, including proteins, non-protein drugs, and nucleic acids, to aquatic animals, especially fish, in an aquatic medium wherein the compound is added to the medium and ultrasound is applied to the medium to enhance or effect the uptake of the compound by the animal. In one example, gonadotropin-releasing hormone analogue (GnRHa) was administered to fish via water to which ultrasound was applied for ten to fifteen minutes at an intensity of 1.7 W/cm$^2$. Fish treated with ultrasound had blood levels of 3.29±1.0 ng/ml of GnRHa as compared to levels of 0.50±0.23 ng/ml for fish exposed to GnRHa in the absence of ultrasound.

13 Claims, 1 Drawing Sheet

ULTRASOUND-MEDIATED ADMINISTRATION OF COMPOUNDS INTO AQUATIC ANIMALS

The Government has rights in this invention pursuant to contract Number NA86AA-D-SG089 (RB/30) awarded by the Department of Commerce.

BACKGROUND OF THE INVENTION

This is generally in the area of drug delivery of compounds to aquatic animals, and in particular uses ultrasound to effect or enhance uptake of compounds by aquatic animals.

Fish farming has become one of the most rapidly growing agricultural industries in recent years. One of the major problems in commercial fish farming is the administration of drugs, peptides, proteins, vaccines and other chemical compounds to the fish. Currently, approaches for the administration of these compounds to fish is by injection, use of implants, incorporation into food, or, for a limited number of agents, via diffusion from the water (with or without a short osmotic shock). In general, all of these methods are labor intensive, often inefficient and sometimes not successful. In many cases it is impractical on a commercial scale to inject each fish or crustacean with drug. The uptake of these compounds coadministered with food or placed directly in the water is inefficient and unpredicatable, often requiring high levels of drug.

Ultrasound has been suggested as a means of administering drugs through the skin. The drug is administered topically to the skin, a coupling gel applied, and ultrasound applied to the drug via a probe placed in contact with the gel. The ultrasound enhances permeation of the drugs through the skin at a controlled rate. The advantages of this technique is that the ultrasound forces some drugs through the skin that could not otherwise be delivered transdermally and the transfer occurs at a controlled rate. Such a method is described in U.S. Pat. No. 4,767,402 to Kost, et al. Applying the ultrasound method for transdermal drug delivery to aquatic animals would be impractical, extremely labor intensive, and the results not predictable, particularly in the case of fish since the skin of a mammal and the scaled skin of a fish are so different. Ultrasound has also been used to force DNA into mammalian embryos under highly controlled laboratory conditions.

It is therefore an object of the present invention to provide a method for effecting or enhancing administration of compounds to a variety of aquatic animals.

It is a further object of the present invention to provide a method for administration of compounds on a large, commercially useful scale.

SUMMARY OF THE INVENTION

A method for administering compounds, including proteins (as used herein, protein includes peptides, polypeptide and protein macromolecules), non-protein drugs, and nucleic acids, to aquatic animals, especially fish, in an aquatic medium by applying ultrasound to the aquatic medium containing the compound to be administered to enhance or effect the uptake of the compound by the animal from the water.

In one example, gonadotropin-releasing hormone analogue (GnRHa) was administered to fish via water to which ultrasound was applied for ten to fifteen minutes at an intensity of 1.7 W/cm$^2$. Fish exposed to ultrasound had blood levels of 3.29±1.0 ng/ml of GnRHa as compared to levels of 0.50±0.23 ng/ml for fish exposed to GnRHa in the absence of ultrasound.

DETAILED DESCRIPTION OF THE INVENTION

Figure 1:
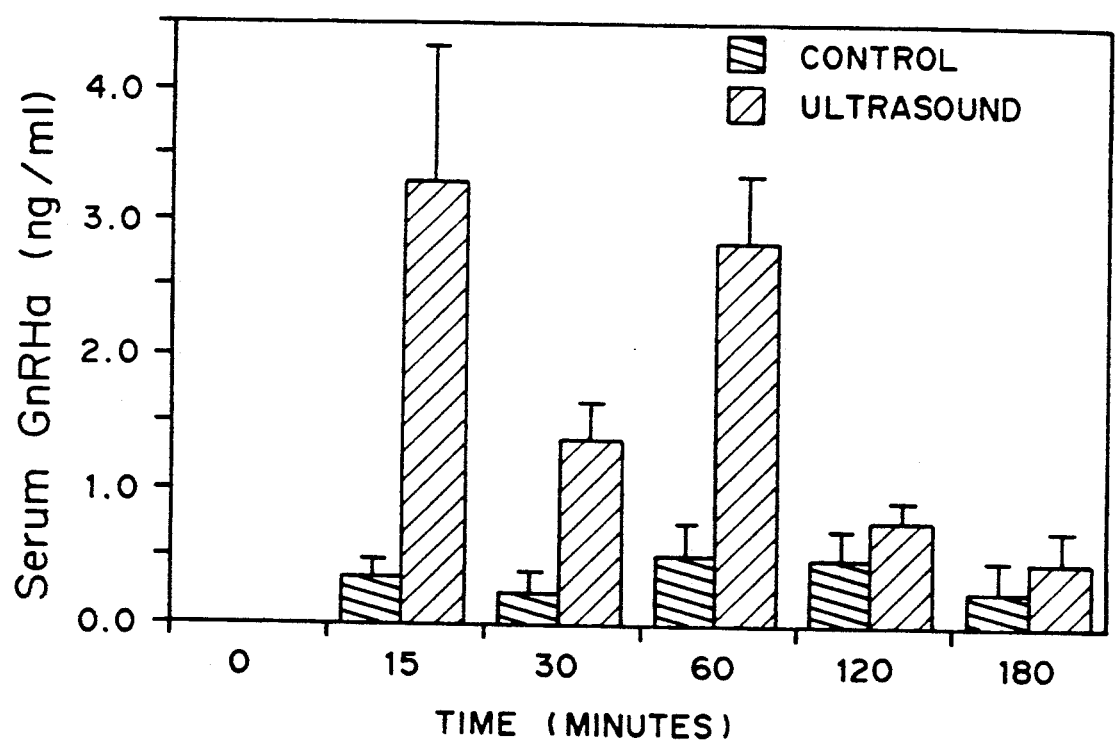
FIG. 1 is a graph of the levels of GnRHa (ng/ml) in the plasma of the fish over time (minutes), comparing fish exposed to GnRHa in the absence of ultrasound ([dark]) and in the presence of ultrasound ([///]).

The efficient administration of compounds into aquatic animals in an aqueous medium is effected, or enhanced, by exposing the aquatic medium containing the compound to be administered to short-term, generally less than one hour, low intensity, generally less than 3 W/cm$^2$ at the surface of the aquatic animal, ultrasound. Using this approach, a highly significant uptake ($P<0.001$) of a gonadotropin-releasing hormone analogue (GnRHa) from the water into the blood system of fish was achieved. This method is expected to have tremendous benefits in commercial aquaculture as a simple and highly efficient method for the administration of chemical agents into aquatic animals.

Examples of animals that can be treated using this method include fish, crustaceans (such as shrimp and lobsters), and molluscs. Embryos, hatchlings, and adult aquatic animals can all be treated with this method, although the optimum conditions will vary according to the type, age and condition of the animal. For embryos, conditions will also vary depending on the type of egg. Fish eggs have quite different properties than mammalian or avian eggs since they are usually fertilized externally.

Compounds which can be delivered into aquatic animals using ultrasound include proteins (peptides, polypeptides and protein macromolecules), nucleic acid sequences encoding proteins, non-protein chemical compounds, such as most antibiotics, antifungals, steroids, vitamins, and nutrients, and minerals. Specific examples are hormones (such as gonadotropins, gonadotropin-releasing hormones, growth hormones, and thyroid hormones) and vaccines. These compounds can be used to improve reproduction, growth rates, disease resistance and general performance. The mechanism can also be used to administer small microencapsulated implants or even to "seed" molluscs, for the production of pearls.

The ultrasound is generally applied to the aquatic medium surrounding the animal or its eggs. The compound may be absorbed into the tissues, blood, or, in the case of eggs, into the cytoplasm or nucleus. Ultrasound can travel undiminished for long distances in water, losing only 50% of the energy at a water depth of about 11.5 meters, for ultrasound at 1 MHz, assuming no other medium is present. The distance over which the ultrasound can travel is dependent on the frequency of the ultrasound. At a distance of approximately 38 meters, only about 90% of the intensity of ultrasound at 1 MHz is present.

Ultrasound is defined as sound having a frequency greater than 20 kHz. Ultrasound used for medical diagnostic purposes usually employs frequencies ranging from 0.75 to about 10 MHz. As used herein, frequencies of between 20 kHz and 10 MHz with intensities between 0 and 3 W/cm$^2$ are generally used to enhance transfer of molecules. Exposures of only a few minutes are usually sufficient since the response time to the ultrasound is very rapid. Care must be taken to avoid excessive exposure, usually in excess of one hour.

Devices are available which emit both pulsed and continuous ultrasound. The specific embodiment of the ultrasound device is not important. Probes, baths, and boxes are all useful depending on where and how the ultrasound is to be applied. Ultrasound devices are manufactured by Sonics and Materials, Inc., Danbury, CT, and Enraf Nonius, Al-Delft, The Netherlands.

Because ultrasound does not transmit well in air, as well as because aquatic animals do better in water, the ultrasound is preferably applied to the water in which the animal is located. In addition, or alternatively, although not preferred, the ultrasound can be applied to the animal or the eggs directly, taking care to avoid overexposure.

The present invention is further demonstrated by reference to the following non-limiting example.

EXAMPLE 1

Administration of Gonadotropin-Releasing Hormone analogue to Goldfish.

Methods

Goldfish (Carassius auratus) 12 to 15 cm long, weighing 23.0±2.9 g were purchased from Ozark Fisheries, Inc., Stoutland, Missouri. The fish were individually marked with tags and stocked in a 180 liter aquarium. The water temperature was maintained at 20° C.

Fish were divided into 2 experimental groups, each consisting of 10 fish. Fish from the first group (control) were immersed in a solution of a nanopeptide analog of the Gonadotropin Releasing Hormone- [D-Ala$^6$,Pro$^9$-NET]-LHRH (GnRHa, Bachem, Bubendorf M.W. 1167) and were not exposed to ultrasound. Fish from the second group (ultrasound exposed) were immersed in a solution of similar concentration and exposed to ultrasound. Each fish was introduced into separate 2000 ml glass beakers containing 1200 ml of the GnRHa solution at a concentration of 500 ng/ml. The diameter of the beakers was 13 cm and the depth of water approximately 10 cm. The fish were kept in the beakers for 1 hour. Fish from the ultrasound group were exposed to ultrasound for the first 10 to 15 minutes. The ultrasound was administered using a therapeutic ultrasound generator (Sonopuls 434, Enraf Nonius, Al-Delft, The Netherlands). A 1 MHz probe with an effective radiating area of 5 cm$^2$ was used, the surface of which was maintained just below the surface of the solution in the beakers. The probe was slowly moved over the beaker surface area during application of ultrasound. The intensity of ultrasound applied was 1.7 W/cm$^2$. After 1 hour in the hormonal solution, all the fish were returned to the 180 liter aquarium which contained water without hormone.

Five fish from each group were bled before their introduction into the hormone solution and at 30 and 120 minutes. The five remaining fish in each group were bled at 15, 60 and 180 minutes following their introduction into the hormone solution. For the sampling of blood, the fish were anesthetized in a 300 ppm solution of 2 phenoxy ethanol (Merck). 200-250 $\mu$l of blood was removed from the caudal vessels using 1 ml syringes and 23 g needles. The fish recovered from anesthesia rapidly (within 2 to 3 minutes) when replaced into water. Blood samples were placed on ice for 2 to 3 hours and then centrifuged for 10 min at 15,000 rpm. Serum was removed and stored at $-30°$ centigrade for radioimmunoassay (RIA) of the GnRHa.

Radioimmunoassay for [D-Ala$^6$,Pro$^9$-NET]-LHRH

A specific, homologous RIA for [D-Ala$^6$, Pro$^9$-NET]-LHRH was used for the determination of its levels in the serum. 50 $\mu$l of a diluted serum sample or a standard were incubated with 50 $\mu$l of rabbit antiserum against [D-Ala$^6$, Pro$^9$-NET]-LHRH in a final volume of 500 $\mu$l for 24 h at 4° C. Incubation was performed in 0.01 M phosphate saline buffer pH 7.6 containing 0.2% of BSA. After 24 h, 50 $\mu$l of radiolabelled I$^{125}$-[D-Ala$^6$, Pro$^9$-NET]-LHRH was added to all tubes and the incubation was continued under the same conditions for another 24 h. At the end of this incubation the bound fraction of the [D-Ala$^6$, Pro$^9$-NET]-LHRH was precipitated using a second antibody, raised against rabbit gamma globulins. The precipitate was counted in a gamma radioactivity counter. The serum levels of the GnRHa were calculated after a log-logit linearization of the standard curve. The sensitivity of the RIA was 0.02 ng/ml and its precision (intra-assay variability) was 3.2%.

Results

The levels of the GnRHa in the plasma of the fish before and during the course of the study are shown in FIG. 1. As expected, no GnRHa was measured in the blood of the fish before their exposure to the hormone solution. There was some uptake of GnRHa from the water by the control fish, with a maximum measured level of GnRHa in the plasma of the control fish being 0.50±0.23 ng/ml after 1 hour of immersion in the hormone solution. The exposure of the fish to 10 to 15 min of ultrasound dramatically enhanced the uptake of the GnRHa from the water into the fish. Plasma GnRHa levels increased to 3.29±1.00 ng/ml after 15 minutes ultrasound exposure and were still elevated 45 minutes later (2.83±0.49 ng/ml). Thirty minutes after fish were exposed to 10 minutes of ultrasound, blood GnRHa levels were 1.36±0.27 ng/ml. During the entire period of immersion in the GnRHa solution (60 minutes), GnRHa levels measured in the plasma of the fish exposed to ultrasound were significantly higher ($P<0.001$) than the GnRHa levels measured in the plasma of the control fish (FIG. 1).

Upon removal of the fish from the beakers containing the hormone, the GnRHa was cleared from the circulation, and by 180 minutes (2 hours after the transfer to clean water), plasma GnRHa levels in the ultrasound treated fish were not different from those observed in the control fish (FIG. 1).

The data thus clearly demonstrates that a short-term exposure of goldfish to therapeutic levels of ultrasound dramatically enhances the uptake of a nanopeptide from the water into the fish blood.

Modifications and variations of the method for effecting or enhancing uptake of compounds by aquatic animals using ultrasound will be obvious to those skilled in the art from the foregoing detailed description of the invention. Such modifications and variations are intended to come within the scope of the appended claims.

We claim.

1. A method for administering compound to an aquatic animal in an aqueous medium comprising adding the compound to be administered to the aqueous medium and applying ultrasound to the aqueous medium containing the compound for a period of time effective to increase the level of compound in the animal as compared with a control animal not exposed to ultrasound.

2. The method of claim 1 wherein the animal is selected from the group consisting of fish, crustaceans, molluscs, and eggs thereof.

3. The method of claim 1 wherein the compound is selected from the group consisting of proteins, nucleic acid sequences encoding proteins, non-protein chemical compounds and minerals.

4. The method of claim 3 wherein the compound is selected from the group consisting of antibiotics, antifungals, steroids, vitamins, and nutrients.

5. The method of claim 3 wherein the protein is selected from the group consisting of hormones and vaccines.

6. The method of claim 1 wherein the ultrasound is applied for between 1 and 60 minutes.

7. The method of claim 1 wherein the ultrasound is applied at an frequency of between 20 kHz and 10 MHz with an intensity between 0 and 3 W/cm$^2$ at the surface of the aquatic animal.

8. The method of claim 1 wherein compounds are administered to multiple animals using ultrasound applied to an aqueous solution containing all of the animals and the compound to be administered.

9. A system for administration of compound to aquatic animals comprising:

an aquatic medium containing the compound to be administered, wherein the aquatic medium is not harmful to the aquatic animal, and means for applying ultrasound to the aqueous medium at a frequency of between 20 kHz and 10 MHz with an intensity between 0 and 3 W/cm$^2$ at the surface of the animals to be treated with compound.

10. The system of claim 9 wherein the compound is selected from the group consisting of proteins, nucleic acid sequences encoding proteins, non-protein chemical compounds and minerals.

11. The system of claim 10 wherein the compound is selected from the group consisting of antibiotics, antifungals, steroids, vitamins, and nutrients.

12. The system of claim 10 wherein the protein is selected from the group consisting of hormones and vaccines.

13. The system of claim 10 further comprising an animal selected from the group consisting of fish, crustaceans, molluscs, and eggs thereof.

* * * * *